Jan. 23, 1951  S. K. FOSTER  2,538,937
APPARATUS FOR CONTINUOUSLY PRODUCING
FRENCH FRIED FOODS
Filed Aug. 17, 1946  2 Sheets-Sheet 1
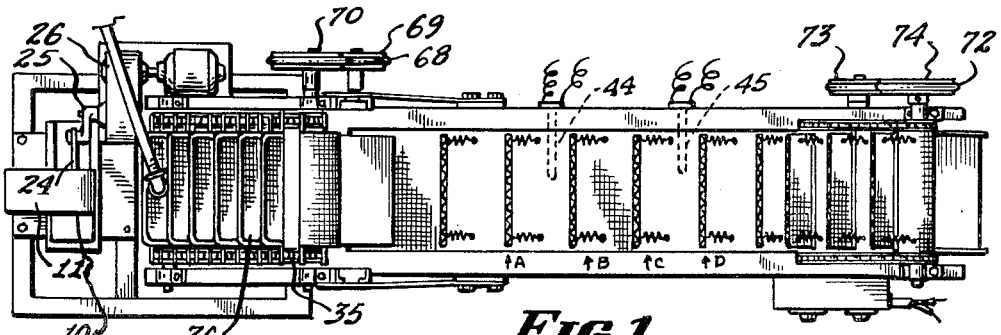
FIG.1.
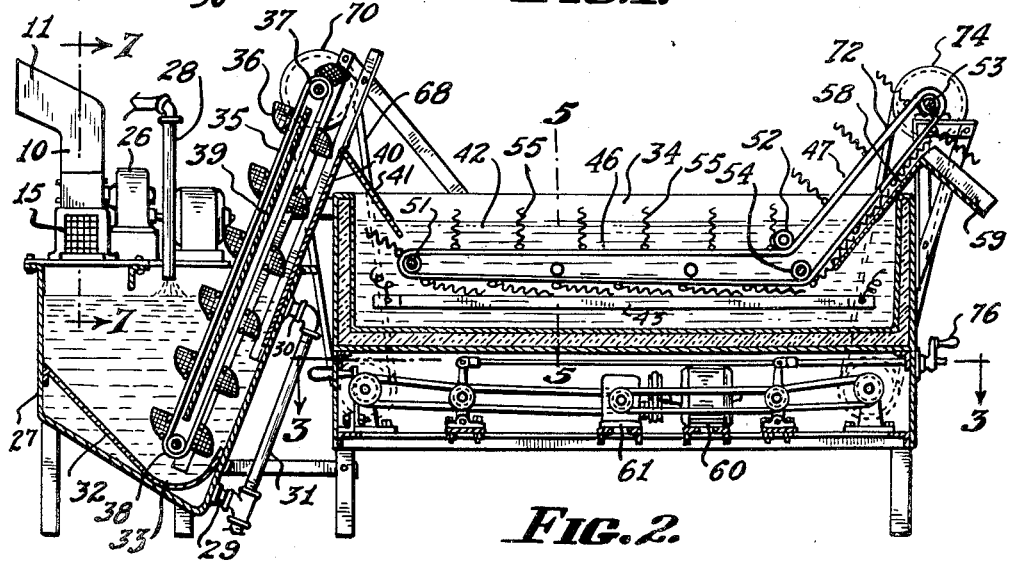
FIG.2.
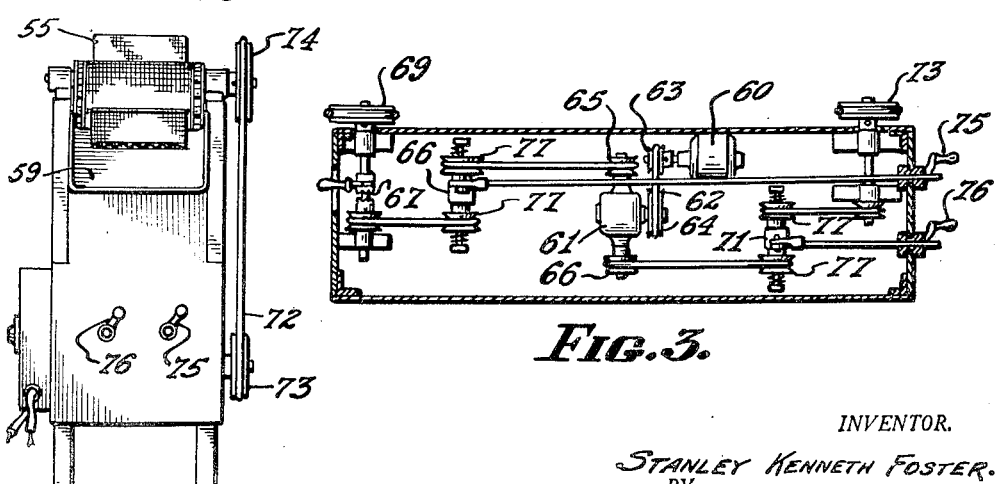
FIG.3.
FIG.4.
INVENTOR.
STANLEY KENNETH FOSTER.
BY
Allen & Allen
ATTORNEYS.

Jan. 23, 1951 S. K. FOSTER 2,538,937
APPARATUS FOR CONTINUOUSLY PRODUCING
FRENCH FRIED FOODS
Filed Aug. 17, 1946 2 Sheets-Sheet 2

INVENTOR.
STANLEY KENNETH FOSTER.
BY Allen & Allen
ATTORNEYS.

Patented Jan. 23, 1951

2,538,937

UNITED STATES PATENT OFFICE 2,538,937

APPARATUS FOR CONTINUOUSLY PRODUCING FRENCH FRIED FOODS

Stanley Kenneth Foster, Cincinnati, Ohio, assignor to Spuds, Inc., Cincinnati, Ohio, a corporation of Ohio Application August 17, 1946, Serial No. 691,298

2 Claims. (Cl. 99—404)

This invention relates to an apparatus and process for continuously producing French fried foods and more particularly to an apparatus and process suitable for quantity production and useful at fairs, circuses, large restaurants, and hotels.

It is an object of my invention to provide a machine into which various raw foods may be fed, and which will French fry them and deliver them continuously and automatically. Since various foods require different cooking times, it is an object of my invention to provide for movement of the foods through a cooking vessel at a predetermined speed, whereby cooking times may be determined by inserting the goods at appropriate stations along the cooking vessel.

It is another object of my invention to provide a continuous machine into which peeled potatoes may be fed and which will cut the potatoes to the desired form, wash them, French fry them, and deliver them ready for consumption continuously and automatically. In this connection, it is a further object of my invention to provide an apparatus which is relatively simple in construction and in operation.

It is another object of my invention to provide a process for continuously producing French fried potatoes, whereby large quantities of French fried potatoes may be prepared in a minimum of time.

It is a still further object of my invention to provide an apparatus in which potatoes of any size may be conveniently handled by providing means, whereby extra large potatoes are cut down to a predetermined maximum size before being cut to shape.

Still further objects of my invention include the provision of means for maintaining accurately the temperature of the cooking vessel and for determining the length of time the foods remain in said vessel.

These and other objects of my invention which will be pointed out in more detail hereinafter or which will be apparent to one skilled in the art upon reading these specifications, I accomplish by that certain construction and arrangement of parts and by that series of method steps of which I shall now describe an exemplary embodiment.

Reference may be had to the drawings forming a part hereof and in which Fig. 1 is a plan view of a machine according to my invention.

Fig. 2 is a longitudinal cross sectional view thereof.

Fig. 3 is a cross sectional view taken on the line 3—3 of Fig. 2.

Fig. 4 is an end elevational view as seen from the right hand end of Figs. 1, 2, and 3.

Figure 7:
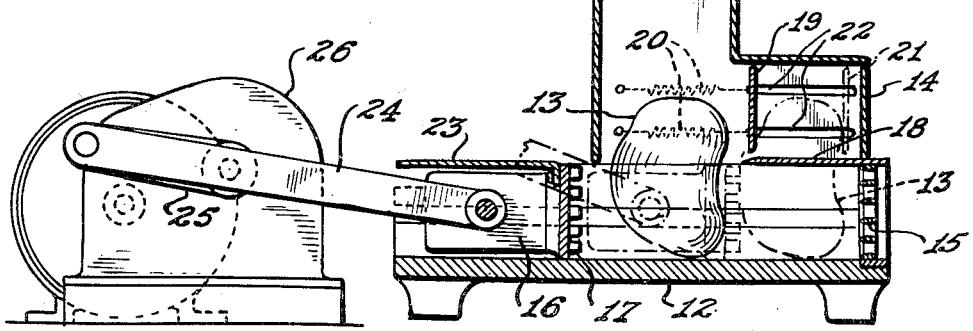
Fig. 7 is a cross sectional view on an enlarged scale taken on the line 7—7 of Fig. 2.

Generally speaking, my invention comprises three basic portions. These are the sizing and cutting portion, the washing portion, and the frying portion. If the machine is to be used for foods other than potatoes, the sizing and cutting portion may be eliminated. The cutting portion which will be described first includes a feed hopper, a sizing means, and a means for cutting the sized potato into slabs ready for frying. This portion of the apparatus is best seen in Fig. 7.

I provide a hopper, generally indicated at 10, which preferably has an angular entrance portion 11 for safety reasons. The hopper 10 has a bottom 12 upon which a potato comes to rest; such a potato is indicated at 13 in Fig. 7. Adjacent the bottom of the hopper, I provide a lateral extension chamber 14 of a size to accommodate the largest potato to be operated upon. A cutting grill comprising a plurality of blade elements is indicated generally at 15 and a ram member 16 having projections 17 is arranged to reciprocate through the bottom of the hopper 10 and chamber 14 to force a potato through the cutting grill 15, whereby the potato is cut into slabs preparatory to cooking. In order to take care of oversized potatoes, I provide a cutting blade 18 parallel to the path of the ram 16 and disposed at the edge of the cutting grill 15, so that if the potato 15 is too large to be forced through the grill, the excess portion of the potato will be sliced off by the blade when the ram thrusts the potato toward the cutting grill. It will be noted that in the chamber 14 and above the blade 18, I provide a plate member 19 which is urged to the position shown in the solid lines by the springs 20, but which may be moved to a dotted line position 21 during the cutting operation. The plate 19 is guided by pins extending into ways 22, and it will be understood that as soon as the upper portion of the potato is severed from the rest of the potato, the member 19 will return to the solid line position under the influence of the springs 20. The ram 16 is provided with a cover plate 23, so that the severed upper part of the potato will be pushed back on to the plate 23; then when the ram 16 returns to its solid line position, the severed upper portion of the potato will drop down in front of the ram and will be pushed through the cutting grill 15 on the succeeding stroke of the ram. The ram may be reciprocated by means of a connecting rod 24, driven by a crank 25, driven by a suitable motor 26.

As will be clear from the various figures, the slabs issuing from the cutting grill 15 drop into the washing receptacle indicated generally at 27. A supply of water is fed to the receptacle 27 through a pipe 28 and is drawn off at the bottom through a pipe 29. Preferably, I also provide an overflow pipe 30 connected by a pipe 31 to the pipe 29 and thence to any suitable drain. I preferably provide a baffle 32 within the receptacle 27, or the bottom of the member 27 may be sloped as at 32, so that the potato slabs dropping into the water, which is fairly turbulent, will roll down the surface 32, thereby being thoroughly rinsed until they collect in the region indicated at 33 in Fig. 2.

For removing the washed slabs of potatoes from the washing vessel and transferring them to the deep fat cooking vessel, which is generally indicated at 34, I provide a conveyer, generally indicated at 35. The conveyer 35 comprises a plurality of wire baskets 36 mounted on sprocket chains passing over the sprockets 37 and 38. These baskets may be of a predetermined size, so as to deliver say, one pound of potatoes each. Between the flights of the conveyer 35, I preferably provide a baffle plate 39, so that excess rinse water dropping from the potatoes in the baskets 36, as they emerge from the wash water, will be deflected back into the vessel 27. I also prefer to provide a baffle plate 40 to catch any excess water which might be carried over the sprocket 37. As the baskets 36 pass over the sprockets 37, they tip over and the slabs of potatoes therein drop out and are deflected by a baffle 41 into the vessel 34.

Figure 5:
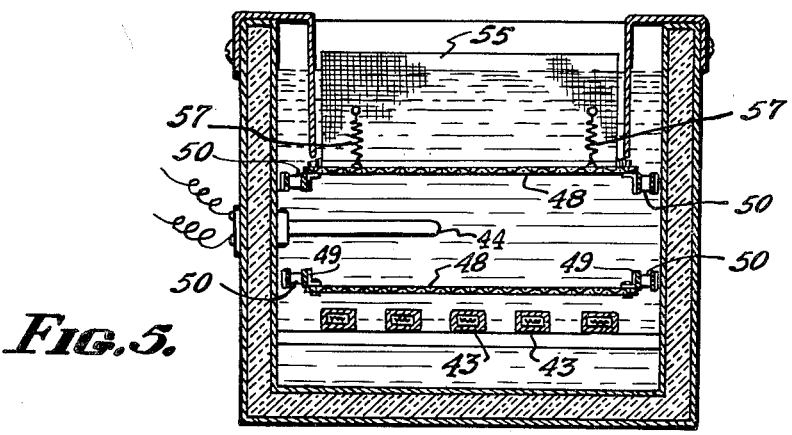
Fig. 5 is a cross sectional view on an enlarged scale taken on the line 5—5 of Fig. 2.

The vessel 34, as best seen in Figs. 2 and 5, comprises insulated side, end, and bottom walls and is filled with a suitable cooking fat or grease indicated at 42. Heating elements 43 are provided for heating the fat in the vessel 34 and temperature responsive devices 44 and 45 extend into the cooking fat and are connected in any desired manner with control means to establish upper and lower limits for the temperature of the grease. Such means forming no part of my invention will not be described further.

A conveyer, generally indicated at 46, is arranged within the vessel 34 so as to have a horizontal flight within the vessel 34 and an angular flight 47 emerging from the vessel 34. The conveyer 46 comprises a web of foraminous material, such as screening or the like indicated at 48 which is fastened by means of brackets 49 to sprocket chains 50. The chains 50 pass over the sprockets 51, 52, 53, and 54 which are mounted on suitable shafts in the walls of the vessel 34.

Figure 6:
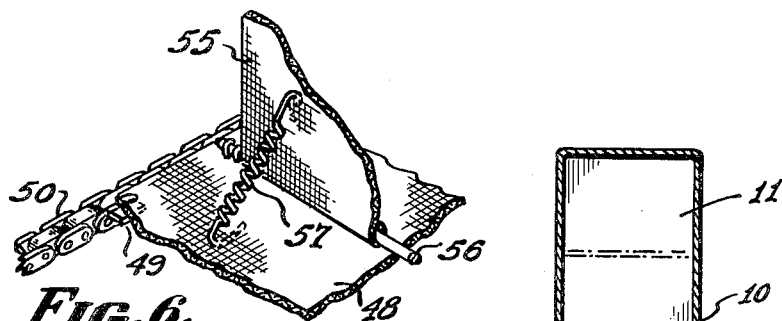
Fig. 6 is a partial perspective view on an enlarged scale of a portion of the conveyer showing the manner of its attachment to sprocket chains and the mounting of the resilient baffles.

Since some of the potato slabs or other foods, during the process of cooking, may tend to float in the deep fat and might therefore not be carried through the machine by the conveyer 46, I provide a series of resilient baffles 55 which are hingedly mounted on the web 48 as by means of rods 56, as best seen in Fig. 6. Springs 57 permit the baffles 55 to yield in order to clear the heating elements 43 and the baffle 58, and will return the baffles 55 to their erect position when they pass around the sprockets 51 and clear the baffle 41. As will be clear, the baffles 55 carry along any floating foods and insure that all foods, whether floating or resting on the conveyor, will be cooked for the same length of time. The baffle 58 is arranged to deflect back into the vessel 34 any dripping fat or grease as the foods are being conveyed upwardly, out of the cooking vessel on the flight 47 of the conveyer. As the foods pass over the sprocket 53, they drop down on to a chute 59 and may be collected in any convenient container for immediate distribution, or for reheating, prior to sale.

If it is desired to cook foods having other cooking times than potatoes, such foods may be dropped into the vessel 34 at an appropriate station, indicated in Fig. 1 by the arrows and letters A, B, C, etc. Each such station may carry an instruction plate listing the particular foods which should be inserted at such station. It will be understood that these instructions will be correct for a certain speed of the conveyer 46, which will have to be maintained.

The conveyers 35 and 46 are driven from a motor 60 as will now be described. The motor 60 drives a speed reducer 61 by means of a belt 62 passing over the motor pulley 63 and the reducer pulley 64. The reducer 61 is provided with two pulleys 65 and 66, and the pulley 65 drives the conveyer 35 through a variable speed drive, generally indicated at 66, and a clutch 67 and the belt 68 transmitting the power from the pulley 69 to the pulley 70. The pulley 66 drives the conveyer 46 through the variable speed drive 71 and the belt 72 between the pulleys 73 and 74. The clutch 67 is provided so that the conveyer 35 may be stopped independently of the conveyer 46, as is desirable when continuous operation is to be stopped or suspended. The variable speed drives 66 and 71 are controlled by the hand cranks 75 and 76 respectively, and control the speed of the conveyers 35 and 46 respectively. The drives 66 and 71 may be of any desired type, and I have shown a drive of the type in which the faces of the pulleys 77 are yieldingly urged together, so that as the shafts supporting the pulley 77 are rocked to one side or the other, as the tension on the belt passing over such pulley is reduced, the faces of the pulley approach each other, thus effectively increasing the pitch diameter thereof, and if the tension in the belt is increased, the faces of the pulley may separate, thus effectively decreasing the pitch diameter thereof.

In its method aspect, as to potatoes, my invention involves the predetermination of a maximum sized potato to be operated upon, the cutting down of potatoes larger than this size to the predetermined maximum, cutting the sized potato into slabs, washing the slabs, draining them, drying them in deep fat, and draining off excess fat in a continuous operation.

As to other foods, my method involves the predetermination of the cooking time and speed of the conveyer in the cooking vessel, and inserting the foods at appropriate stations in said vessel, cooking and draining them and delivering them ready for consumption. It may be noted that various foods may be simultaneously cooked without transference of taste or odor, because the hot grease sears the foods and seals in the flavor and odor almost instantaneously.

While I have described my invention in some detail, it will be clear that numerous modifications may be made in the same without departing from the spirit thereof, and I therefore do not intend to limit myself except as pointed out in the claims which follow.

I claim:

1. In a machine for continuously producing French fried potatoes or the like, an elongated, insulated cooking vessel adapted to contain fat, means for heating the fat in said cooking vessel, an endless conveyor belt of foraminous material traversing a substantially horizontal path through said vessel constituting an upper flight, and having a portion moving upwardly at an angle out of said vessel, returning downwardly at an angle into said vessel and traversing a substantially horizontal path constituting a lower flight, said belt having spaced baffles of foraminous material of a height to extend from said upper flight substantially to the top of said vessel so as to project above the surface of the fat in said vessel, said lower flight being closer to said heating means than the height of said baffles, said baffles being tiltably secured to said belt with means connected to said belt and said baffles yieldingly holding them in substantially perpendicular relation to said belt, whereby said baffles may tilt to clear said heating means, and then return to their perpendicular position.

2. In a machine for continuously producing French fried potatoes or the like, an elongated, insulated cooking vessel adapted to contain fat, means for heating the fat in said cooking vessel, an endless conveyor belt of foraminous material having upper and lower parallel flights extending horizontally substantially the length of said vessel, and having parallel flights extending upwardly at an angle out of said vessel, said belt having spaced baffles of foraminous material of a height to extend from said upper flight substantially to the top of said vessel so as to project above the surface of the fat in said vessel, said lower flight being closer to said heating means than the height of said baffles, said baffles being tiltably secured to said belt with means connected to said belt and said baffles yieldingly holding them in substantially perpendicular relation to said belt, whereby said baffles may tilt to clear said heating means, and then return to their perpendicular position.

STANLEY KENNETH FOSTER.

REFERENCES CITED

The following references are of record in the file of this patent:

UNITED STATES PATENTS

| Number | Name | Date |
| --- | --- | --- |
| 44,709 | Curtis | Oct. 18, 1864 |
| 57,111 | Forschner | Aug. 14, 1866 |
| 293,754 | Lintner | Feb. 19, 1884 |
| 900,554 | Knapp | Oct. 6, 1908 |
| 1,086,248 | Varian | Feb. 3, 1914 |
| 1,245,380 | Peters | Nov. 6, 1917 |
| 1,320,294 | Todd | Oct. 28, 1919 |
| 1,358,167 | Levin | Nov. 9, 1920 |
| 1,389,976 | Patten | Sept. 6, 1921 |
| 1,518,206 | Kramer | Dec. 9, 1924 |
| 1,599,916 | Nye | Sept. 14, 1926 |
| 1,676,160 | Buffner | July 3, 1928 |
| 1,741,791 | Reck | Dec. 31, 1929 |
| 1,771,456 | Alexander | July 29, 1930 |
| 1,806,302 | Magrill | May 19, 1931 |
| 2,097,471 | Scharsch | Nov. 2, 1937 |
| 2,097,793 | Howell | Nov. 2, 1937 |
| 2,190,432 | McKee | Feb. 13, 1940 |
| 2,207,316 | Ferry | July 9, 1940 |
| 2,212,461 | Swartz | Aug. 20, 1940 |
| 2,251,111 | Brown | July 29, 1941 |
| 2,259,073 | McGlaughlin | Oct. 14, 1941 |
| 2,369,274 | Beatty | Feb. 13, 1945 |